United States Patent [19]
Dzierzbicki

[11] Patent Number: 5,820,298
[45] Date of Patent: Oct. 13, 1998

[54] SEAMLESS LANDFILL SUMP

[75] Inventor: Thaddeus S. Dzierzbicki, Cary, Ill.

[73] Assignee: National Seal Company, Aurora, Ill.

[21] Appl. No.: 801,348

[22] Filed: Feb. 19, 1997

[51] Int. Cl.$^6$ .................................................. B09B 1/00
[52] U.S. Cl. ........................ 405/129; 210/901; 405/270
[58] Field of Search .................. 405/128, 129, 405/270; 210/170, 901; 299/2

[56] References Cited

U.S. PATENT DOCUMENTS

| | | | |
|---|---|---|---|
| 1,660,818 | 2/1928 | Ranney | 299/2 |
| 3,705,851 | 12/1972 | Brauer | 210/170 X |
| 4,285,547 | 8/1981 | Weichman | 299/2 |
| 4,335,978 | 6/1982 | Mutch | 405/129 |
| 4,592,846 | 6/1986 | Metzger et al. | 210/901 X |
| 4,624,604 | 11/1986 | Wagner et al. | 405/128 |
| 4,696,599 | 9/1987 | Rakoczynski et al. | 405/129 |
| 4,728,222 | 3/1988 | Wiemer | 405/128 |
| 4,810,131 | 3/1989 | Turner | 405/129 |
| 4,863,312 | 9/1989 | Cavalli | 405/128 |
| 4,877,358 | 10/1989 | Ressi Di Cervia | 405/128 X |
| 4,995,969 | 2/1991 | LaVigne | 405/128 X |
| 5,120,161 | 6/1992 | Faussone | 405/129 |
| 5,419,655 | 5/1995 | Phillips et al. | 405/128 X |

*Primary Examiner*—George A. Suchfield
*Attorney, Agent, or Firm*—McDonnell Boehnen; Hulbert & Berghoff

[57] ABSTRACT

A seamless landfill sump including a bottom and a plurality of walls defining an open reservoir and including a welding ledge integral to the reservoir opening. The seamless landfill sump may also include side support ribs integral to the sump bottom and sides.

18 Claims, 4 Drawing Sheets

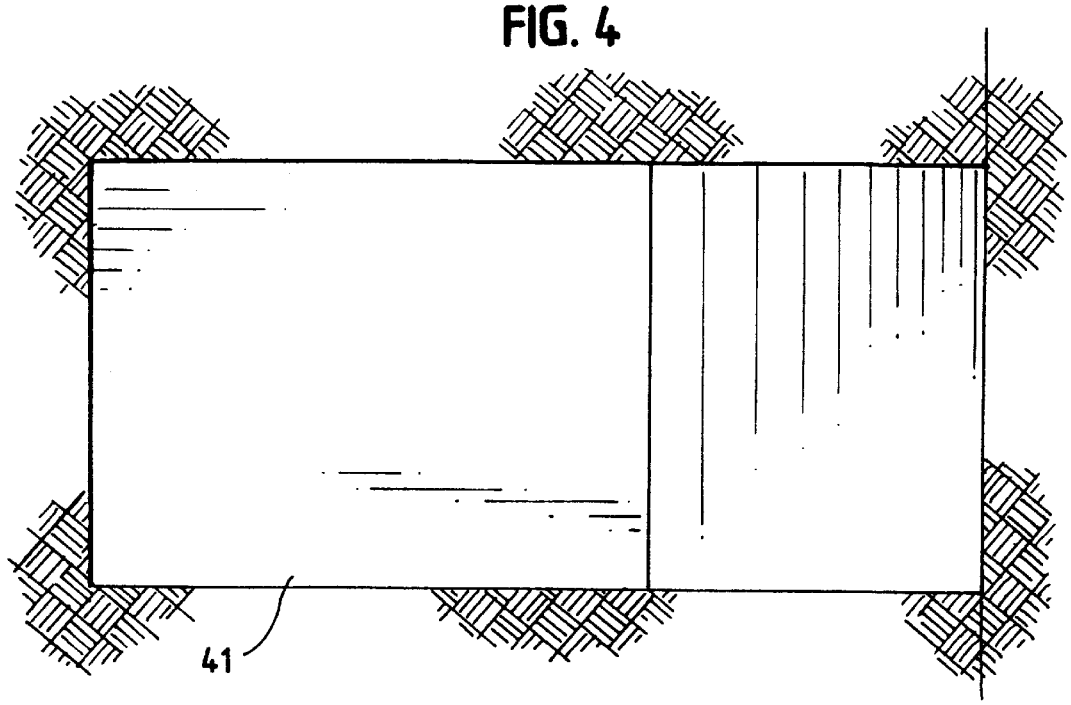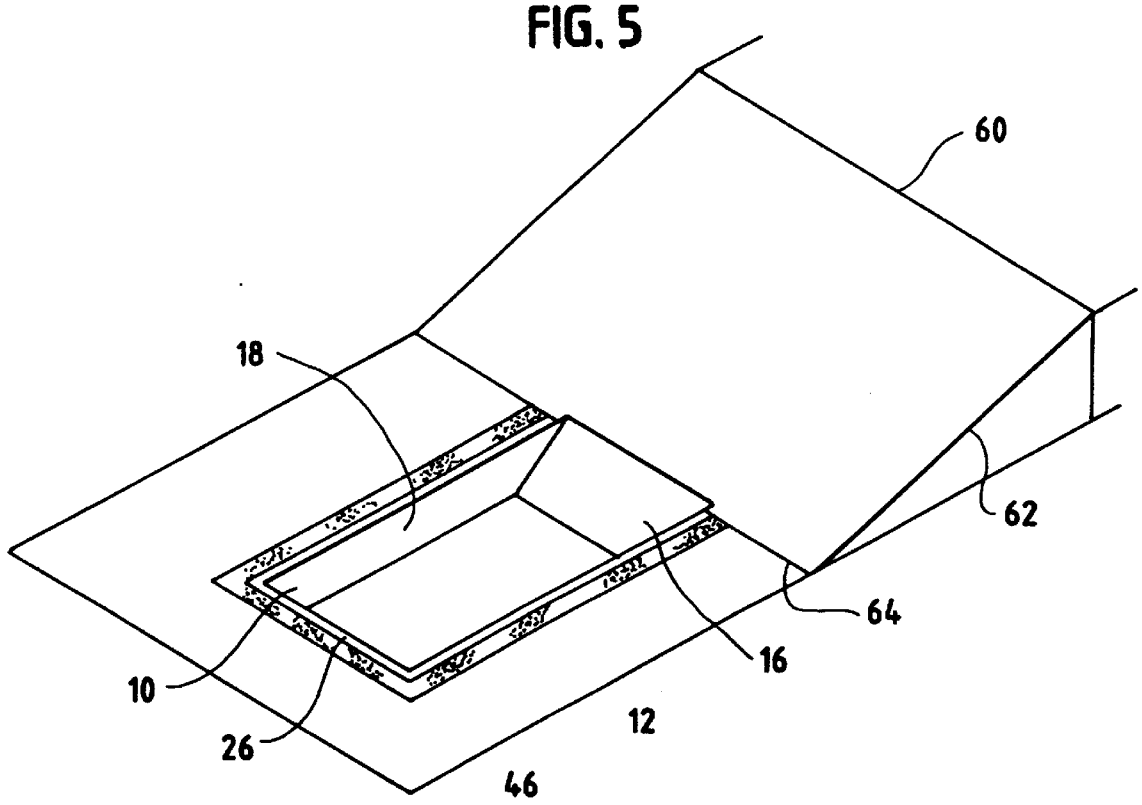

SEAMLESS LANDFILL SUMP

BACKGROUND OF THE INVENTION

(1) Field of the Invention

This invention is a seamless landfill sump and a method for installing a seamless landfill sump in a landfill.

(2) Description of the Art

Government regulations require landfills to be constructed in a way that protects natural surrounding ground water resources from contamination by landfill wastes. For example, the Environmental Protection Agency requires landfills to be constructed with liners to act as barriers against the penetration of leachate and wastes in the landfill into nearby ground water.

Prior to the advent of governmental environmental regulations, landfills usually consisted of unlined excavation or single lined excavations. Because of recent environmental concerns, however, stricter environmental regulations are being enforced. Now, the Environmental Protection Agency requires landfills to contain at least two liners dividing the landfill from the native soil. The Environmental Protection Agency also requires that the landfills be designed and constructed and operated to protect human health and the environment. Finally, the Environmental Protection Agency requires a system to collect and remove landfill leachate incorporated into the landfill. While the Environmental Protection Agency has published general guidelines for constructing double liner landfill systems, the Environmental Protection Agency has not provided specific guidelines for constructing double liner landfill systems as well as leachate detection and collection systems.

Waste disposal systems including sumps and detection systems are described in just a few references. U.S. Pat. No. 3,705,851 describes an above grade waste disposal system including a plurality of downwardly sloping cells that direct any leachate into drainage pipes and thereafter into a reservoir or collection tank connected to a sewage system. The reservoir is separate from each cell.

U.S. Pat. No. 4,335,978 describes an apparatus for controlling leachate from a landfill. The apparatus includes a liquid supply system located between a first landfill liner and a second landfill liner for supplying liquid between the landfill liners to inhibit migration of leachate into the area between the landfill liners.

U.S. Pat. No. 4,696,599 describes a waste landfill system including a primary leachate collection system and a secondary leachate collection system. The landfill system includes a liner covered by a permeable material containing secondary leachate collection system piping which, in turn, is covered by a second impervious layer. The second impervious layer is covered with a permeable material containing primary leachate collection system piping. The primary and secondary leachate collection system piping is connected to a means for collecting and recovering the liquid in the leachate system piping.

U.S. Pat. No. 4,782,222 discloses an arrangement for collecting seepage water from a waste depository. The arrangement consists of a hollow open space located beneath the landfill and an impervious layer located between the hollow structure and the landfill. The hollow structure is high enough to accommodate humans for inspection purposes.

U.S. Pat. No. 4,810,131 describes a landfill leachate collection and leak detection sump system. The system includes a sump basin located above a layer of compacted material and two vertical sumps located in and directly above the sump basin. The system also includes a first liner located at the level of the sump basin and a second liner located between the sumps and the sump basin.

U.S. Pat. No. 4,995,969 discloses a treatment system for landfill leachate. The system includes directing a landfill leachate into the ground surrounding a water impervious treatment basin containing a layer of treatment medium. The treatment system biologically treats the landfill leachate.

SUMMARY OF THE INVENTION

An object of this invention is a seamless, unitary landfill sump that is leak and rupture resistant.

Another object of this invention is a seamless landfill sump that is easy to install in a landfill.

Yet another object of this invention is a seamless landfill sump that can be used in conjunction with one or more one-piece landfill liners to give a lined landfill that is resistant to leaks and rupture.

Still another object of this invention is a method for installing a seamless landfill sump in a landfill that is simple and economical.

In one embodiment, this invention is a seamless landfill sump having a bottom wall integral to a front wall, a rear wall, a first side wall, and a second side wall. The combination of the walls and bottom defines a reservoir including an opening. The sump also includes a welding ledge integral to the reservoir opening.

In another embodiment, this invention is a seamless landfill sump comprising a bottom wall, a front wall, a rear wall, a first side wall, and a second side wall which together define a reservoir. The sump includes an angled wall portion defining the transition between the bottom wall and the front wall back wall first side wall and second side wall. The sump further includes at least one side support rib associated with each of the front wall, rear wall, first side wall, and second side wall. The sump also includes a welding ledge integral to the reservoir opening.

In still another embodiment, this invention is a method for installing a seamless landfill sump into a landfill. The method is accomplished by first excavating a hole large enough to hold the seamless landfill sump in the landfill bottom. The sump is placed in the excavated hole and a seamless landfill sump comprising a bottom wall integral to a front wall, a rear wall, a first side wall, and a second side wall, the combination defining a reservoir including an opening, and a welding lip integral to the reservoir opening is placed on top of the compacted bed. When the seamless landfill sump is placed in the excavated hole, void spaces will still exist between the sump walls and the excavated hole walls. The void spaces are filled with cement or with a compacted seal material. The landfill, except for the seamless landfill sump, is covered with a liner and the liner is extrusion welded to the seamless landfill sump welding ledge so that the sump reservoir remains exposed.

In another embodiment, this invention is a landfill having a plurality of sloped walls, a landfill bottom, and at least one low point. The landfill further comprises a seamless landfill sump located in an excavated hole in the landfill bottom. The seamless landfill sump includes a bottom wall, a front wall, a rear wall, a first side wall, and a second side wall together defining an open reservoir, an angled wall portion defining the transition from the bottom wall to front wall back wall first side wall and second side wall, at least one side support rib associated with each of the front wall, rear wall, first side wall and second side wall, and a welding ledge integral to the reservoir opening. The landfill includes a primary riser having a primary riser inlet located in the seamless landfill sump reservoir and a primary riser outlet is associated with a primary riser liquid withdrawal system. The landfill also includes a secondary riser having an inlet located underneath the seamless landfill sump, and an outlet associated with a secondary riser liquid withdrawal system. At least one landfill liner is extrusion welded to the seamless landfill sump welding ledge, and the liner or liners must be large enough to extend, uninterrupted beyond the landfill embankments.

DESCRIPTION OF THE DRAWINGS

There is shown in the drawings a presently preferred embodiments of a seamless landfill sump of this invention wherein like numerals in the various Figures refer to similar elements and wherein:

FIG. 4 is an overhead view of an excavated hole for containing a seamless landfill sump of this invention;

FIG. 5 is an overhead view of an excavated hole including an embodiment of seamless a landfill sump of this invention;

DESCRIPTION OF THE CURRENT EMBODIMENTS

Figure 1:
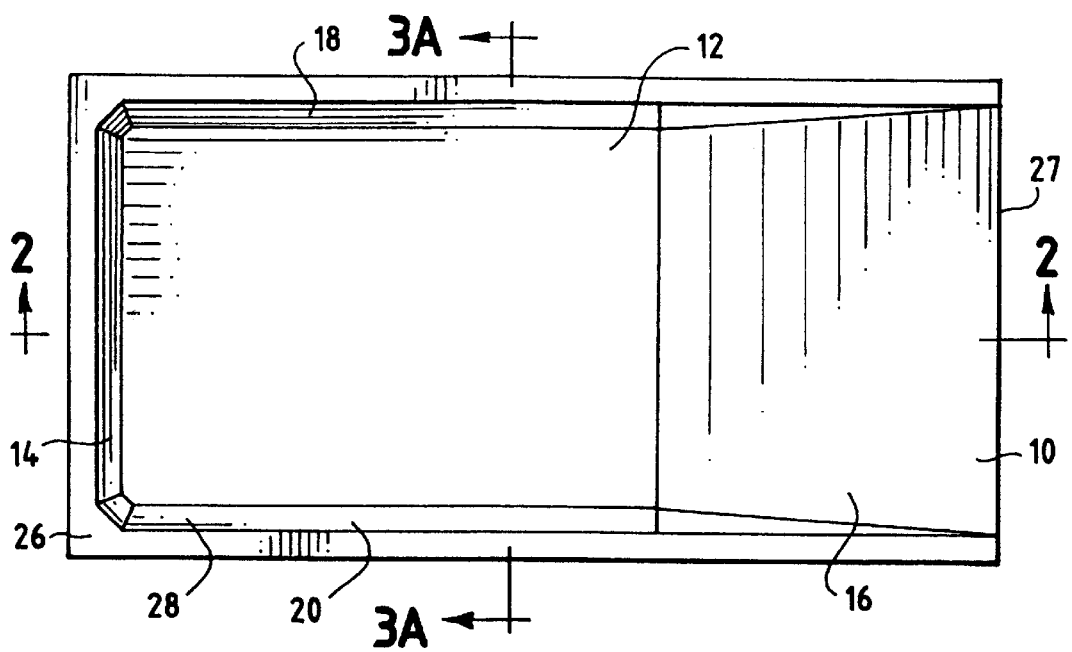
FIG. 1 is a top view of a seamless landfill sump embodiment of this invention.
Figure 2:
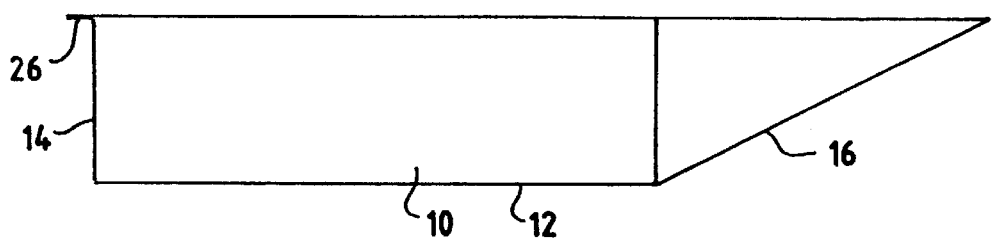
FIG. 2 is a side cut-away view of a seamless landfill sump embodiment of this invention.
Figure 3A:
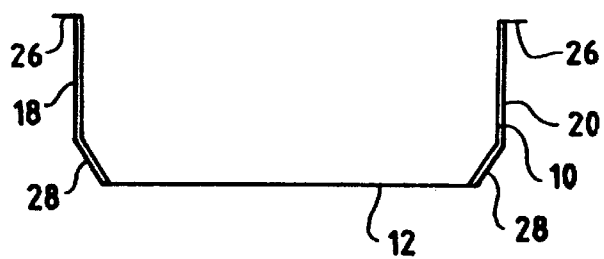
FIG. 3A is an end cut-away view of a seamless landfill sump embodiment of this invention.
Figure 3B:
FIG. 3B is an end cut-away view of an optional side support rib of a seamless landfill sump embodiment of this invention.

This invention is a seamless landfill sump. The seamless landfill sump may be used in conjunction with riser piping systems to remove landfill leachate and to monitor the landfill for the presence of leachate. This invention is also a method for installing a seamless landfill sump at the low point in a landfill. Finally, this invention is a landfill including a leachate detection system and a seamless landfill sump.

FIGS. 1, 2, 3A and 3B show various aspects of a seamless landfill sump 10 of this invention. Seamless landfill sump 10 includes a bottom wall 12, integral to a front wall 14, a rear wall 16, a first side wall 18, and a second side wall 20. The combination of bottom wall 12 and the side walls gives an open top seamless landfill sump 10 that acts as a sump reservoir.

A preferred embodiment of the seamless landfill sump 10 of this invention will include bottom wall 12 and four side walls. However, a seamless landfill sump 10 having a bottom wall 12 and three side walls (triangular in shape) is within the scope of a seamless landfill sump of this invention. Likewise, seamless landfill sumps having a bottom wall and five or more integral side walls (e.g., pentagon) are also within the scope of this invention. Seamless landfill sump fabrication considerations and installation considerations, however, mitigate in favor of a seamless landfill sump 10 having a bottom wall 12 and four side walls that is rectangular or square in shape. To simplify the description of embodiments of this invention, a preferred embodiment of seamless landfill sump 10 of this invention that is rectangular in shape will be used as the basis for further description of the inventions.

The geometry of seamless landfill sump 10 is dictated, in part, by the desire to manufacture a seamless landfill sump 10 having good structural integrity prior to installation in a landfill. Thus, front wall 14, rear wall 16, first side wall 18, and second side wall 20 may be of equal length or they may be unequal in length. It is preferred that front wall 14 and rear wall 16 have equal lengths and that they have a length that is shorter than first side wall 18 and second side wall 20 which also have equal lengths.

Seamless landfill sump 10 includes features that give the sump mechanical strength and stability. Seamless landfill sump 10 may include one or more optional bottom support ribs associated with bottom wall 12. Also, front wall 14, rear wall 16, first side wall 18 and second side wall 20 may each include one or more side support ribs 22. Optional bottom support ribs 24 and side support ribs 22 interrupt the smooth face of the side walls and the bottom wall thereby functioning as support columns that inhibit warping of bottom wall 12 and front wall 14, rear wall 16, first side wall 18, and second side wall 20.

If bottom wall 12 includes one or a plurality of optional bottom support ribs, then the ribs should be located at intervals of from about 2 feet to about 5 feet. Optional bottom support ribs may be perpendicularly oriented with respect to front wall 14 and rear wall 16 or they may be perpendicularly oriented with respect to first side wall 18 and second side wall 20.

It is preferred that seamless landfill sump 10 includes at least one and a plurality of side support ribs 22. The side support ribs are preferably spaced from each other at equal intervals of from about 2 feet to about 5 feet. It is also preferred that side support ribs 22 are perpendicularly oriented in relationship to bottom wall 12.

Front wall 14, rear wall 16, first side wall 18, and second side wall 20 have a bottom dimension integral to bottom wall 12, and a top dimension defining the open perimeter of seamless landfill sump 10. It is preferred that a welding ledge 26 is integral to at least part of the open perimeter of seamless landfill sump 10. The primary function of welding ledge 26, however, is to provide a flat site to which one or more landfill liners can be attached. Welding ledge 26 may be inwardly or outwardly directed, with an outwardly directed ledge being preferred. Welding ledge 26 can have a width of from about 4 inches to about 18 inches or more.

In a preferred embodiment, seamless landfill sump 10 includes an outwardly angled rear wall 16 in which case welding ledge 26 circumscribes the entire perimeter of seamless landfill sump 10 except for lip 27 of outwardly angled rear wall 16. When rear wall 16 is outwardly angled any landfill liner can be associated with the rear wall making a separate lip unnecessary.

Seamless landfill sump 10 preferably includes an angled wall portion 28. Angled wall portion 28 defines the transition between bottom wall 12 and one or more of each of front wall 14, rear wall 16, first side wall 18, and second side wall 20. Angled wall portion 28 is angled inwardly from the side walls toward bottom wall 12. It is preferred that angled wall portion 28 circumscribes the entire bottom perimeter of seamless landfill sump 10. It is also preferred that any side support ribs 22 pass through angled wall portion 28 as shown in FIG. 4.

Like support ribs 22, angled wall portion 28 helps to inhibit warpage of the bottom and walls of seamless landfill sump 10. Also, angled wall portion 28 interrupts the perpendicular transition from the side walls to bottom wall 12, thereby reducing the likelihood that the bottom edges of seamless landfill sump 10 will be punctured or otherwise damaged during transportation or installation of seamless landfill sump 10 in a landfill. Angled wall portion 28 also facilitates the manufacture of seamless landfill sump 10 by vacuum forming.

Seamless landfill sump 10 of this invention may be fabricated out of any polymeric material that is capable of being incorporated into large unitary structures. Such polymers will include polypropylene, polyethylene, polyesters and other polymers with similar properties. A preferred seamless landfill sump material is high density polyethylene. It is also possible that recycled polymer materials can be used to construct seamless landfill sump 10 of this invention.

Seamless landfill sump 10 may be fabricated by any polymer and manufacture process capable of producing large single-piece, seamless structures. Seamless landfill sump 10 will typically have walls many yards in length and many feet high. This makes manufacture of the extremely large single-piece landfill sump very difficult. Processes useful to prepare large single-piece plastic articles include injection molding, rotational molding, and vacuum forming. A preferred manufacturing method is vacuum forming. It is preferred that the bottom and walls of seamless landfill sump 10 have a thickness of from 200 to about 500 mils. It is most preferred that the bottom and walls of seamless landfill sump 10 have a thickness of from 250 to about 500 mils.

Seamless landfill sump 10 will typically be installed in a landfill low point so that landfill leachate will flow into the sump reservoir. The low point may be constructed anywhere in a landfill. It is most common, however, that a landfill low point is constructed along the perimeter of the landfill abutting a landfill retaining wall.

When a seamless landfill sump 10 is installed in a landfill adjacent to a landfill retaining wall, there is a possibility that dirt and other debris from the retaining wall will slide into the sump reservoir and plug leachate withdraw piping. In order to facilitate installation of leachate withdrawal piping, and in order to prevent migration of dirt and other landfill debris from falling into seamless landfill sump 10, the rear wall 16 is preferably outwardly angled. The angle of outward angled rear wall 16 should conform essentially to the angle of the landfill retaining wall so that outwardly angled rear wall 16 will abut the landfill retaining wall, without a significant gap or opening.

Optionally, seamless landfill sump 10 can have a vertical rear wall 16 in conjunction with one or more optional wing walls. The wing walls act as dams to retain the landfill retaining wall while allowing the seamless landfill sump to be installed adjacent to a landfill retaining wall and allow for installation of leachate withdrawal piping.

Figure 8:
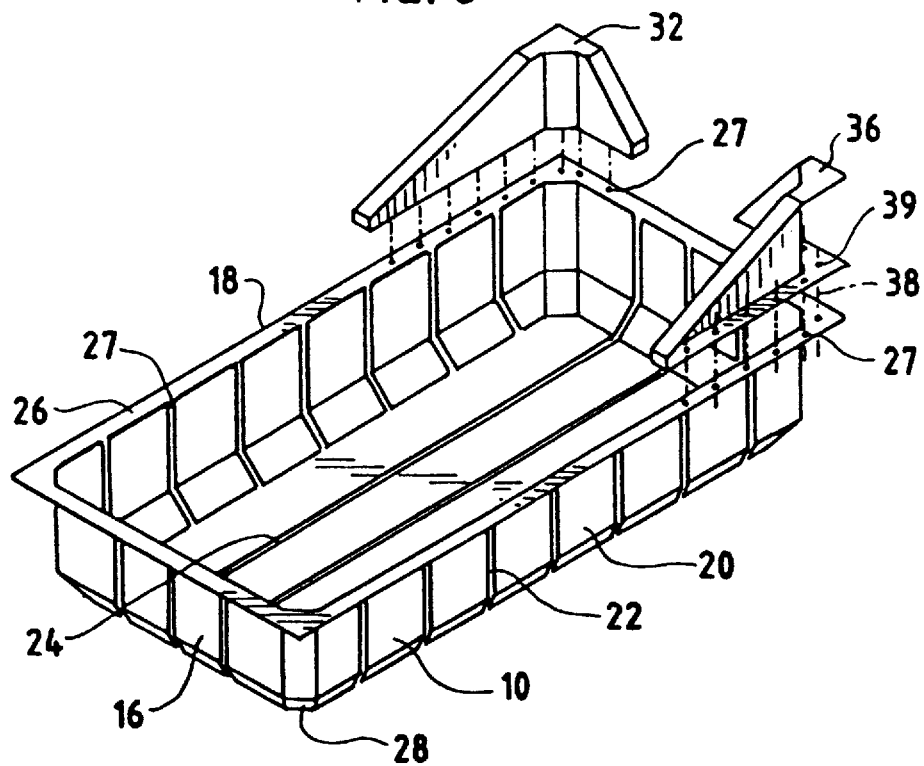
FIG. 8 is a perspective view of a seamless landfill sump embodiment of this invention including an optional first and a second wing wall.
Figure 9:
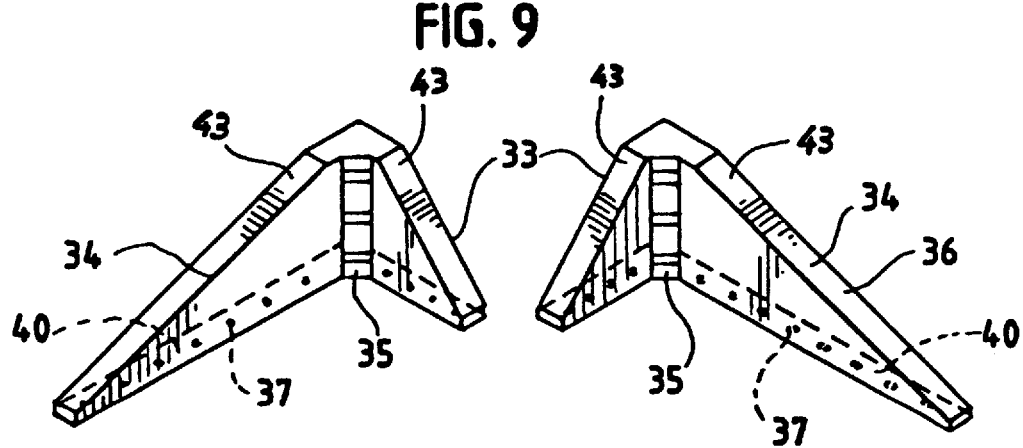
FIG. 9 is a perspective view of embodiment of a first wing wall and a second wing wall that may be associated with a seamless landfill sump of this invention.

FIGS. 8 and 9 show various features of optional wing walls. First wing wall 32 and second wing wall 36, shown in the Figures, are intended to be used in conjunction with a rectangular seamless landfill sump 10. The shape of wing walls associated with seamless landfill sump 10 will, of course, vary depending on the geometry of the sump. First wing wall 32 and second wing wall 36 each have a first face 33 and a second face 34 separated by corner 35. A bottom pad 40 including at least one bolt hole 37 runs the length of the bottom dimension of first face 33 and second face 34 of both first wing wall 32 and second wing wall 36.

As shown in FIG. 8, first wing wall 32 will be associated with a corner of seamless landfill sump 10 where first side wall 18 meets front wall 14, and second wing wall 36 will be associated with a corner of seamless landfill sump 10 where second side wall 20 meets front wall 14. First wing wall 32 and second wing wall 36 are attached to welding ledge 26 of seamless landfill sump 10 by any means known in the art for uniting large polymer-fabricated articles. The wing walls may be extrusion welded to welding ledge 26 of seamless landfill sump 10. Alternatively, the wing walls may be mechanically attached to welding ledge 26 of seamless landfill sump 10. It is preferred that first wing wall 32 and second wing wall 36 are united to seamless landfill sump 10 using a plurality of bolts 38 and nuts 39 which pass through bolt holes 37 in the wing walls and through sump bolt holes 27.

The length of first face 33 and second face 34 of each wing wall will vary depending upon the dimensions of seamless landfill sump 10. Where first side wall 18 and second side wall 20 are greater in length than front wall 14, first face 33 will be shorter in length than second face 34. The opposite will be the case when front wall 14 is greater in length than first side wall 18 and second side wall 20. First face 33 and second face 34 are preferably tapered to conform with the structure of the landfill retaining wall. First face 33 can be tapered conform to any riser pit built to accommodate a leachate withdrawal piping system installed in or underneath seamless landfill sump 10. The taper of second face 34 will generally conform to the pitch of the landfill retaining wall.

In one embodiment, first face 33 of first wing 32 and second wing wall 36 will not be tapered. This wing wall embodiment will be useful where no, or vertical leachate withdrawal piping is used. In this embodiment, the first faces 33 of first wing wall 32 and of second wing wall 36 will abut one another and they will have a height sufficient to retain the landfill retaining wall.

The wing walls, like the seamless landfill sump, may be made out of any polymeric material that is capable of being manufactured into large one-piece articles. A preferred wing wall material is high density polyethylene. Thus, the useful polymers in and the methods for fabricating seamless landfill sump 10 are equally applicable to manufacture the wing walls.

Seamless landfill sump 10 of this invention is preferably used in a secure landfill. FIGS. 4–7 show various embodiments of a procedure for installing a seamless landfill sump 10 into a secure landfill. Before installing seamless landfill sump 10 in a landfill, a permanent disposal site is selected and prepared for disposal of wastes. The disposal site is excavated to provide at least one common low area or point and to provide landfill retaining walls. The foundation or bottom of the disposal site is typically made of compacted on site excavated material. According to FIG. 4, an excavated hole conforming to the dimensions of seamless landfill sump 10 is constructed, preferably, at a site low point. Excavated hole 41 is constructed slightly larger and at about the same height as seamless landfill sump 10. A layer of material is located in the bottom of the hole to give a compacted bed 48. Compacted bed 48 is preferably clay or any other material that is suitable as a seal material. The bottom of compacted bed 48 should have a depth sufficient to be essentially impermeable to water. In order to achieve water impermeability, compacted bed 48 will generally range in thickness from about 1 foot to about 8 feet or more and preferably from about 2 feet to about 4 feet. Compacted bed 48 may extend over the entire foundation of the landfill.

After compacted bed 48 is in place, seamless landfill sump 10 is placed into excavated hole 41. Next, material can be located in landfill sump containing excavated hole 41 to fill the void space between landfill sump walls and the walls of excavated hole 41.

A seal material 46 is placed around seamless landfill sump 10 until the seal material is flush with the landfill foundation and with welding ledge 26 of seamless landfill sump 10. Seal material 46 will have a thickness of from about 1 foot to about 3 feet or more and will consist of any material that is useful for preparing a compacted landfill foundation. It is preferred that the seal material is a cement or high strength concrete. However, the seal material may also be compacted processed clay or bentonite type material.

Figure 6:
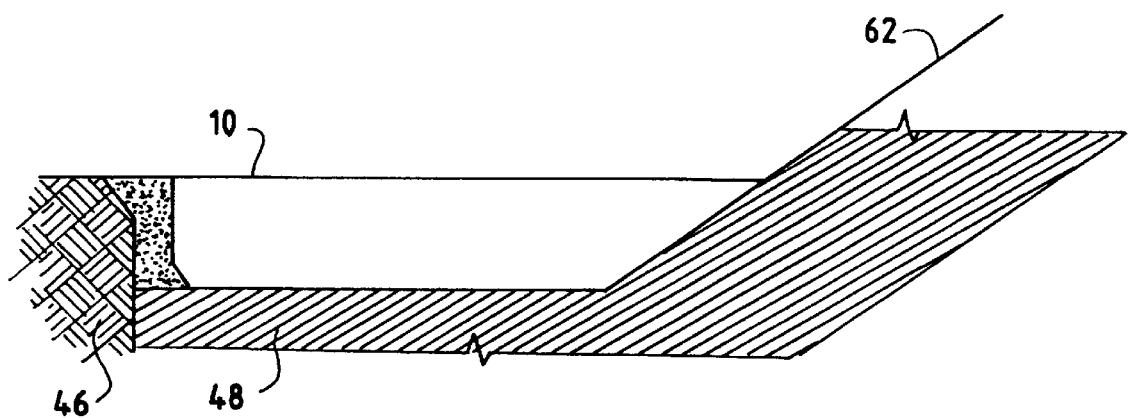
FIG. 6 is a cut-away side view of an excavated hole including an embodiment of a seamless landfill sump of this invention.

It is preferred that seal material 46 is cement or high strength concrete and that compacted bed 48 be clay or bentonite. FIG. 6 is a side cross-section view of a preferred sump foundation.

Seamless landfill sump 10 is preferably braced during installation of seal material 46 by placing bracing beams such as boards inside seamless landfill sump 10. The bracing beams should span the distance between seamless landfill sump side walls or front and back walls. The bracing beams prevent the seamless landfill sump walls from bowing inwardly as compacting material such as concrete is being poured into the void space between the landfill sump walls and the excavated hole.

When cement or high strength concrete is used as seal material 46, then ballast must be placed into seamless landfill sump 10 to prevent seamless landfill sump 10 from floating on the cement. Gravel is the preferred ballast material. The gravel may remain in seamless landfill sump 10 after seal material installation is complete.

The landfill foundation may be overlaid with at least one landfill liner 54. Landfill liner 54 is preferably manufactured of a water impervious material, suitably in film form, that is contoured to cover the entire landfill surface area. Landfill liner 54 may be placed on the landfill surface in strips and the edges secured together by extrusion welding or fusion to obtain leak proof or water tight layer. Optionally, landfill liner 54 may be fabricated and installed as a single piece that includes a hole to accommodate seamless landfill sump 10. Landfill liner 54 is preferably extrusion welded to the welding ledge 26 and optionally extrusion welding to top pad 43 of wing walls 32 and 36.

Landfill liner 54 preferably extends beyond the confines of a landfill as defined by the landfill retaining walls, where it is secured along the outer periphery of the landfill. Landfill liner 54 is fabricated from any inert substantially unreactive synthetic material such as polyethylene, polypropylene, or polyethylene terephthalate. A particularly useful material is high density polyethylene having a thickness of about 30 to about 60 mils. As noted above, this invention contemplates landfills including seamless landfill sump 10 of this invention combined with one, two, three or more layered landfill liners 54 manufactured from the same or different synthetic materials.

A primary riser 50 may be located in the reservoir formed by seamless landfill sump 10. Primary riser 50 may end in one or more perforated pipes for collecting any landfill leachate that collects in the reservoir defined by seamless landfill sump 10. Primary riser piping 50 has an inlet 51 located in the sump bottom of the sump reservoir. Primary riser piping 50 is directed upwards away from seamless landfill sump 10 preferably at an angle essentially identical to slope 62 of the landfill retaining wall. Primary riser 50 extends beyond slope top 60 where it is united with pumps or other devices for withdrawing liquid landfill leachate from seamless landfill sump 10. The purpose of withdrawing landfill leachate from seamless landfill sump 10 via primary riser pump 50 is to obtain samples of the landfill leachate for testing and to provide a way to withdraw the landfill leachate from the landfill for remediation. U.S. Pat. No. 4,810,131 discloses various methods for installing riser piping in a landfill and the patent is incorporated herein by reference.

A secondary riser 52 may optionally be placed beneath seamless landfill sump 10 and within, or above compacted 48. The purpose of secondary riser 52 is to sample aqueous materials underneath seamless landfill sump 10 to verify that leachate is not escaping from the landfill or from landfill sump 10. Secondary riser 52 includes an inlet 53. Inlet 53 may be a hole at the end of the pipe or it may be a series of perforations in the inlet position of secondary riser piping 52. The outlet end of secondary riser piping 52 is associated with pumps or other means of withdrawing any aqueous material that collects in secondary riser piping 52.

Figure 7:
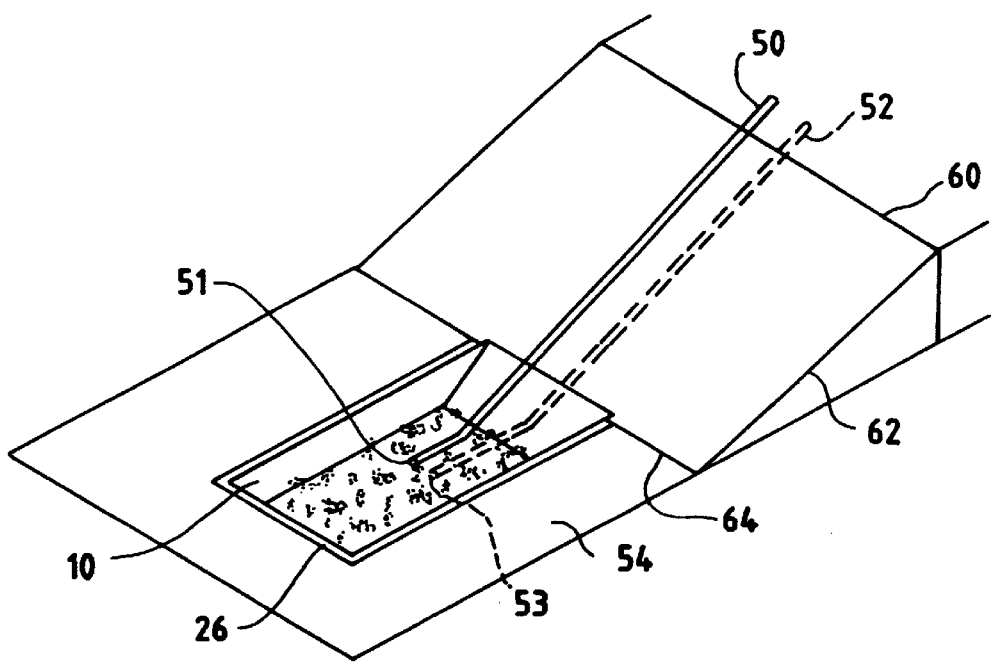
FIG. 7 is a perspective view of an embodiment of a seamless landfill sump of this invention associated with an excavated landfill including details of the association of optional primary riser and secondary riser with the seamless landfill sump embodiment.

FIGS. 5 and 7 show an installed seamless landfill sump 10 of this invention that abuts sloped landfill retaining wall 62 before and after seamless landfill sump 10 is associated with landfill liner 54. Seamless landfill sump 10 abuts the toe 64 of sloped landfill retaining wall 62. Secondary riser piping 52 is located below seamless landfill sump 10 and is directed upwards through sloped landfill retaining wall 62 where it is connected to a secondary riser withdrawal system. A primary riser 50, also located in seamless landfill sump 10. Primary riser 50 has an inlet 51 located in the bottom of the sump reservoir. Primary riser 50 is directed upwardly along slope 62 of the landfill wall retaining where the primary riser outlet is connected to a landfill leachate withdrawal system.

While the present invention has been described by means of specific embodiments, it will be understood that modifications may be made without departing from the spirit of the invention. For example, the landfill may include more than one seamless landfill sump, or it may include more than one secondary riser piping system. Therefore, the scope of the invention is not to be considered as limited by the specific illustrations, but rather as defined by the following claims.

What I claim is:

1. A seamless landfill sump comprising a bottom wall integral to a front wall, a rear wall, a first side wall, and a second side wall, the combination defining a reservoir including an opening, and a welding ledge integral to the reservoir opening wherein the first side wall and second side wall each include at least one support rib.

2. The seamless landfill sump of claim 1 wherein the support rib is integral to each wall and is selected from the group consisting of convex support ribs and concave support ribs.

3. The seamless landfill sump of claim 1 wherein the welding ledge is oriented perpendicular the reservoir walls.

4. The seamless landfill sump of claim 1 including an outwardly angled rear wall.

5. The seamless landfill sump of claim 1 wherein the front wall, rear wall, first side wall and second side wall each include an angled wall portion.

6. The seamless landfill sump of claim 5 wherein an angled wall portion defines the transition from the bottom wall to front wall, back wall first side wall, and second side wall.

7. A seamless landfill sump comprising a bottom wall, a front wall, a rear wall, a first side wall, and a second side wall defining an open reservoir, an angled wall portion defining the transition from the bottom wall to front wall, back wall, first side wall, and second side wall, at least one side support rib associated with each of the front wall, rear wall, first side wall and second side wall, and a welding ledge integral to the reservoir opening.

8. The seamless landfill sump of claim 7 including a first wing wall and a second wing wall, each wing wall including a first face and a second face divided by a corner, and a bottom pad.

9. The seamless landfill sump of claim 9 wherein the rear wall is outwardly angled.

10. A method for installing a seamless landfill sump into a landfill comprising the steps;
   (a) excavating a hole including a bottom and walls that is large enough to hold the seamless landfill sump;
   (b) placing a seamless landfill sump comprising a bottom wall integral to a front wall, a rear wall, a first side wall, and a second side wall, the combination defining a reservoir including an opening, and a welding ledge integral to the reservoir opening into the excavated hole;
   (c) placing a seal material between the seamless landfill sump walls and the hole walls; and
   (d) covering the landfill, except for the seamless landfill sump with a liner and extrusion welding the liner to the seamless landfill sump welding ledge.

11. The method of claim 10 wherein the excavated hole is excavated at a landfill low point.

12. The method of claim 10 wherein the excavated hole is excavated at a toe of a landfill embankment.

13. The method of claim 10 wherein a secondary riser is located in the excavated hole before the seamless landfill sump is located in the excavated hole.

14. The method of claim 10 wherein a primary riser is located in the seamless landfill sump reservoir after the seamless landfill sump is located in excavated hole.

15. A method for installing a seamless landfill sump into a landfill comprising the steps of;
   (a) preparing a landfill including embankment walls, a bottom, and at least one landfill low point adjacent to a landfill embankment;
   (b) excavating a hole large enough to hold the seamless landfill sump at the landfill low point adjacent to the landfill embankment including a bottom and walls;
   (c) constructing a sump foundation in the excavated hole;
   (d) placing a seamless landfill sump comprising a bottom wall, a front wall, an angled rear wall, a first side wall, and a second side wall defining an open reservoir, an angled wall portion defining the transition from the bottom wall to front wall, back wall first side wall, and second side wall, and a welding ledge integral to the reservoir opening into the sump foundation; and
   (e) covering the landfill, except for the seamless landfill sump with a liner and extrusion welding the liner to the seamless landfill sump welding ledge.

16. The method of claim 15 wherein a secondary riser is located in the excavated hole before the seamless landfill sump is located in the excavated hole.

17. The method of claim 15 wherein a primary riser is located in the seamless landfill sump reservoir after the seamless landfill sump is located in excavated hole.

18. A landfill having a plurality of sloped walls a landfill bottom, and at least one low point comprising:
   (a) a seamless landfill sump located in an excavated hole and comprising a bottom wall, a front wall, an angled rear wall, a first side wall, and a second side wall defining an open reservoir, an angled wall portion defining the transition from the bottom wall to front wall, back wall, first side wall, and second side wall, at least one side support rib associated with each of the front wall, rear wall, first side wall and second side wall, and a welding ledge integral to the reservoir opening;
   (b) a primary riser having an primary riser inlet located in the seamless landfill sump reservoir and an outlet associated with a primary riser liquid withdrawal system;
   (c) a secondary riser located having an inlet located underneath the seamless landfill sump, and an outlet associated with a secondary riser liquid withdrawal system; and
   (d) at least one landfill liner that is extrusion welded to the seamless landfill sump welding ledge, and that extends beyond the landfill embankments.

* * * * *